US010341940B2

(12) United States Patent
Frenger et al.

(10) Patent No.: US 10,341,940 B2
(45) Date of Patent: Jul. 2, 2019

(54) HIERARCHICAL ACCESS INFORMATION TABLES FOR CONTROLLING OF ACCESS TO A CELLULAR NETWORK

(71) Applicant: Telefonaktiebolaget LM Ericsson (publ), Stockholm (SE)

(72) Inventors: Pål Frenger, Linköping (SE); Erik Eriksson, Linköping (SE); Martin Hessler, Linköping (SE); Jianfeng Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 21 days.

(21) Appl. No.: 15/553,004

(22) PCT Filed: Feb. 25, 2015

(86) PCT No.: PCT/EP2015/053932
§ 371 (c)(1),
(2) Date: Aug. 23, 2017

(87) PCT Pub. No.: WO2016/134760
PCT Pub. Date: Sep. 1, 2016

(65) Prior Publication Data
US 2018/0035358 A1 Feb. 1, 2018

(51) Int. Cl.
*H04W 48/10* (2009.01)
*H04W 48/16* (2009.01)
(Continued)

(52) U.S. Cl.
CPC ........ *H04W 48/10* (2013.01); *G06F 12/1009* (2013.01); *H04W 48/12* (2013.01);
(Continued)

(58) Field of Classification Search
CPC .............................. H04W 48/10; H04W 48/16
(Continued)

(56) References Cited

U.S. PATENT DOCUMENTS 9,055,557 B1 * 6/2015 Bayar .................... H04W 76/10
2002/0173316 A1 * 11/2002 Jang ....................... H04W 48/06
455/453
(Continued)

FOREIGN PATENT DOCUMENTS

EP 2800430 A1 5/2014
WO 2008153271 A 12/2008
(Continued)

OTHER PUBLICATIONS

Frenger, P., et al., "A Clean Slate Radio Network Designed for Maximum Energy Performance," 2014 IEEE 25th Annual International Symposium on Personal, Indoor, and Mobile Radio Communication, IEEE, Sep. 2, 2014, pp. 1300-1304.
(Continued)

*Primary Examiner* — John J Lee
(74) *Attorney, Agent, or Firm* — Patent Portfolio Builders, PLLC (57) ABSTRACT

An access node (110) of a cellular network sends a first access information table in a broadcast transmission to a plurality of communication devices (10). The first access information table comprises a first group of entries. Each entry of the first group indicates one or more parameters for controlling access of the communication devices (10) to the cellular network and is mapped to an identifier from a first group of identifiers. Further, the access node (110) sends a second access information table in a unicast transmission to one of the communication devices (10). The second access information table comprises a second group of entries. Each entry of the second group indicates one or more parameters for controlling access of the communication device (10) to the cellular network and is mapped to an identifier from a second group of identifiers.

18 Claims, 7 Drawing Sheets

(51) Int. Cl.
*H04W 48/12* (2009.01)
*H04W 52/02* (2009.01)
*G06F 12/1009* (2016.01)

(52) U.S. Cl.
CPC ....... *H04W 48/16* (2013.01); *H04W 52/0216* (2013.01); *H04W 52/0219* (2013.01); *Y02D 70/00* (2018.01); *Y02D 70/1262* (2018.01)

(58) Field of Classification Search
USPC ............... 455/515, 434, 509, 452.1, 517
See application file for complete search history.

(56) References Cited

U.S. PATENT DOCUMENTS

| | | | |
|---|---|---|---|
| 2009/0219816 A1* | 9/2009 | Rezaiifar | H04W 74/0866 370/235 |
| 2014/0169283 A1 | 6/2014 | Viorel et al. | |

FOREIGN PATENT DOCUMENTS

| | | |
|---|---|---|
| WO | 2012118591 A1 | 9/2012 |
| WO | 2014070048 A1 | 5/2014 |
| WO | 2014119832 A1 | 8/2014 |

OTHER PUBLICATIONS

Office Action issued in application No. 15707099.6, dated Oct. 18, 2018; 9 pages.

\* cited by examiner

| $SSS_{index}$ | $N_{SSS\text{-}range}$ | ACCESS PARAMETER(S) |

HIERARCHICAL ACCESS INFORMATION TABLES FOR CONTROLLING OF ACCESS TO A CELLULAR NETWORK

TECHNICAL FIELD

The present invention relates to methods for controlling access to a cellular network and to corresponding devices.

BACKGROUND

To increase efficiency of fifth generation (5G) cellular networks, a concept was suggested which is based on a layered transmission of access information (see, e.g., "A Clean Slate Radio Network Designed for Maximum Energy Performance" by p. Frenger et al., presented on the IEEE 25th Annual International Symposium on Personal, Indoor, and Mobile Radio Communications (PIMRC), Washington, D.C., Sep. 2-5, 2014). In this concept, user equipments (UEs) are provided with access information by using broadcasted access information tables (AITs) and a broadcasted system signature sequences (SSSs), where each SSS may be used to identify information from the broadcasted AIT. The AIT may for example define settings concerning a how a UE shall access the system, e.g., by a random access procedure, concerning how the UE can be reached by the system in a paging procedure, or concerning more advanced settings, such as related to beam forming or link adaptation. The AITs are typically transmitted with long periodicity, while the SSSs are typically transmitted more frequently. Typically each access node (e.g., a base station) will transmit an SSS which allows the UE to identify the information applicable to this access node from the AIT. The AITs do not need to be transmitted by every access node. For example, a base stations serving a macro cell may transmit both an AIT and an SSS, while a base station serving a small cell within a coverage region of the macro cell may transmit only an SSS. Accordingly, the AIT will typically include entries applying to various access nodes, which means that the AIT may have considerable size.

The size of the AIT may result in high radio resource usage and energy consumption for broadcasting the AIT. On the other hand, the information from the AIT required by different UEs may vary. For example, some UEs may need only basic information from the AIT, e.g., parameters for controlling a random access procedure or a paging procedure, while other UEs may require further information from the AIT, e.g., parameters for controlling beam forming.

Accordingly, there is a need for techniques which allow for efficiently distributing access information in a cellular network.

SUMMARY

According to an embodiment of the invention, a method of controlling access to a cellular network is provided. According to the method, an access node of the cellular network sends a first access information table in a broadcast transmission to a plurality of communication devices. The first access information table comprises a first group of entries. Each entry of the first group indicates one or more parameters for controlling access of the communication devices to the cellular network and is mapped to an identifier from a first group of identifiers. Further, the access node sends a second access information table in a unicast transmission to one of the communication devices. The second access information table comprises a second group of entries. Each entry of the second group indicates one or more parameters for controlling access of the communication device to the cellular network and is mapped to an identifier from a second group of identifiers.

According to a further embodiment of the invention, a method of controlling access to a cellular network is provided. According to the method, a communication device receives, from the cellular network, a first access information table in a broadcast transmission addressed to a plurality of communication devices. The first access information table comprises a first group of entries. Each entry of the first group indicates one or more parameters for controlling access of the communication devices to the cellular network and is mapped to an identifier from a first group of identifiers. Further, the communication device receives a second access information table in a unicast transmission from the cellular network. The second access information table comprises a second group of entries. Each entry of the second group indicates one or more parameters for controlling access of the communication device to the cellular network and is mapped to an identifier from a second group of identifiers. Further, the communication device accesses the cellular network on the basis of one or more of the parameters indicated by the first access information table and the second access information table.

According to a further embodiment of the invention, an access node for a cellular network is provided. The access node comprises a radio interface and at least one processor. The at least one processor is configured to send, via the radio interface, a first access information table in a broadcast transmission to a plurality of communication devices. The first access information table comprises a first group of entries. Each entry of the first group indicates one or more parameters for controlling access of the communication devices to the cellular network and is mapped to an identifier from a first group of identifiers. Further, the at least one processor is configured to send, via the radio interface, a second access information table in a unicast transmission to one of the communication devices. The second access information table comprises a second group of entries. Each entry of the second group indicates one or more parameters for controlling access of the communication device to the cellular network and is mapped to an identifier from a second group of identifiers.

According to a further embodiment of the invention, a communication device is provided. The communication device comprises a radio interface for accessing a cellular network. Further, the communication device comprises at least one processor. The at least one processor is configured to receive, from the cellular network, a first access information table in a broadcast transmission addressed to a plurality of communication devices. The first access information table comprises a first group of entries. Each entry of the first group indicates one or more parameters for controlling access of the communication devices to the cellular network and is mapped to an identifier from a first group of identifiers. Further, the at least one processor is configured to receive, a second access information table in a unicast transmission from the cellular network. The second access information table comprises a second group of entries. Each entry of the second group indicates one or more parameters for controlling access of the communication device to the cellular network and is mapped to an identifier from a second group of identifiers. Further, the at least one processor is configured to control access of the communication device to the cellular network on the basis of one or more of the parameters indicated by the first access information table and the second access information table.

According to a further embodiment of the invention, a computer program or computer program product is provided, e.g., in the form of a non-transitory storage medium, which comprises program code to be executed by at least one processor of an access node of a cellular network. Execution of the program code causes the access node to send a first access information table in a broadcast transmission to a plurality of communication devices. The first access information table comprises a first group of entries. Each entry of the first group indicates one or more parameters for controlling access of the communication devices to the cellular network and is mapped to an identifier from a first group of identifiers. Further, execution of the program code cause the access node to send a second access information table in a unicast transmission to one of the communication devices. The second access information table comprises a second group of entries. Each entry of the second group indicates one or more parameters for controlling access of the communication device to the cellular network and is mapped to an identifier from a second group of identifiers.

According to a further embodiment of the invention, a computer program or computer program product is provided, e.g., in the form of a non-transitory storage medium, which comprises program code to be executed by at least one processor of a communication device for a cellular network. Execution of the program code causes the communication device to receive, from the cellular network, a first access information table in a broadcast transmission addressed to a plurality of communication devices. The first access information table comprises a first group of entries. Each entry of the first group indicates one or more parameters for controlling access of the communication devices to the cellular network and is mapped to an identifier from a first group of identifiers. Further, execution of the program code causes the communication device to receive, a second access information table in a unicast transmission from the cellular network. The second access information table comprises a second group of entries. Each entry of the second group indicates one or more parameters for controlling access of the communication device to the cellular network and is mapped to an identifier from a second group of identifiers. Further, execution of the program code causes the communication device to access the cellular network on the basis of one or more of the parameters indicated by the first access information table and the second access information table.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to control of access to a cellular network by communication devices, in the following also referred to as UEs. In the illustrated examples, it is assumed that information which is utilized by the UEs for accessing the cellular network is provided in a layered manner to the UEs. Specifically, AITs are transmitted by some access nodes of the cellular network to the UEs. The AITs include entries which are each identified by an identifier, e.g., an SSS. The access nodes each transmit such identifier, and the UEs may utilize this transmitted identifier to identify an AIT entry which is applicable for the specific access node. The AITs do not need to be transmitted by every access node. That is to say, there may be access nodes which transmit the identifier, but no AIT. The UEs may then utilize the transmitted identifier to identify an AIT entry of an AIT transmitted by another access node. Further, the AITs may be transmitted less frequently than the identifiers. Accordingly, changes in the way of utilizing a certain access node for accessing the cellular network may be indicated by modifying the identifier transmitted by this access node. The cellular network may for example be based on a 5G radio access technology, such as an evolution of the LTE (Long Term Evolution) radio access technology specified by 3GPP ($3^{rd}$ Generation Partnership Project). However, it is to be understood that the illustrated concepts could also be applied to other radio access technologies.

In the illustrated examples, the transmission of AITs to the UEs is organized in a hierarchical manner by utilizing at least broadcast transmissions and unicast transmissions for providing the AITs to the UEs. Here, a broadcast transmission is considered to be a transmission addressed to all UEs in a certain coverage area of the cellular network. The broadcast transmission may be a single frequency network (SFN) transmission covering multiple cells of the cellular network. A unicast transmission is considered to be a transmission addressed to one specific UE. In addition, also multicast transmissions may be utilized for providing the AITs to the UEs. Here, a multicast transmission may be considered as a transmission which is addressed to a certain group of UEs. Also the multicast transmission may be an SFN transmission covering multiple cells of the cellular network.

By utilizing the broadcast transmissions, the unicast transmissions, and optionally also the multicast transmissions, AITs can be provided in an efficient manner to the UEs. In particular, information which generically applies to all UEs in a certain coverage area may be conveyed in broadcast transmissions, while the unicast transmissions may be utilized for conveying information which is applicable for only one or some of the UEs. In this way, an excessive size of the AIT conveyed in the broadcast transmission can be avoided. The AITs conveyed in the unicast transmissions or multicast transmissions may for example be utilized for indicating UE specific access parameters to the UEs, e.g., concerning UE specific beam forming. Further, such UE specific access parameters may also relate to UE specific link adaptation or a UE specific HARQ (Hybrid Automatic Repeat Request) configuration.

Figure 1:
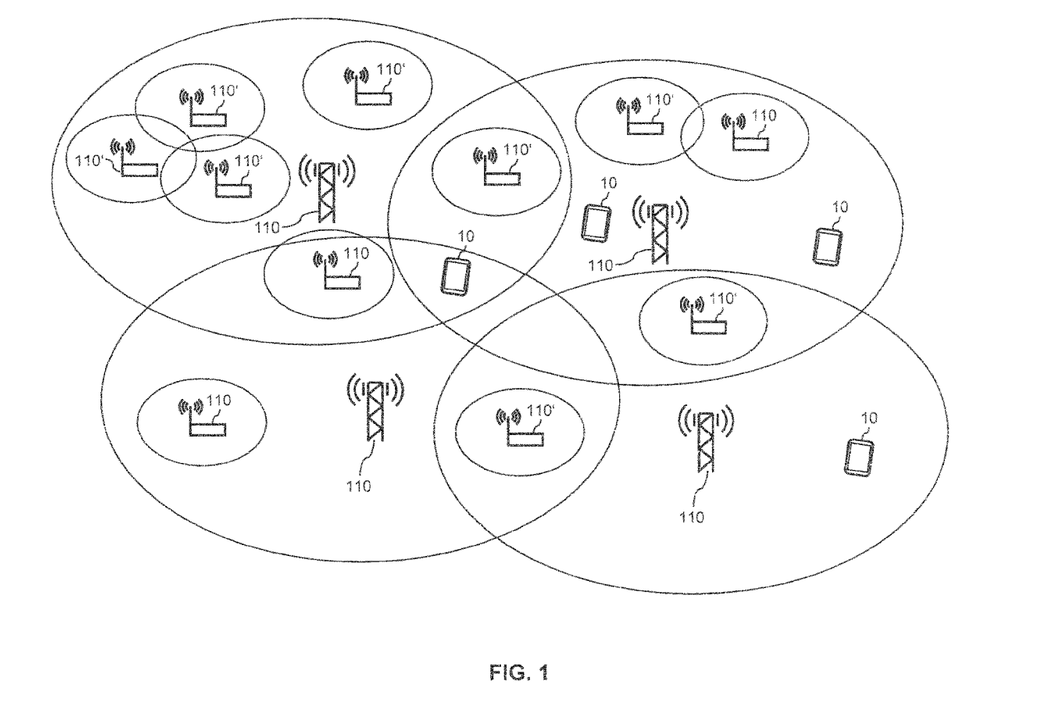
FIG. 1 schematically illustrates a cellular network architecture in which access control is implemented according to an embodiment of the invention.

FIG. 1 schematically illustrates a cellular network architecture which may be used for implementing the concepts as outlined above. In particular, FIG. 1 illustrates UEs 10 various access nodes 110, 110' of the cellular network. In the illustrated example, the access nodes 110, 110' are assumed to be base stations 110 serving macro cells and base stations 110' serving small cells within a coverage region of such macro cell.

As mentioned above, the UEs 10 utilize information from AITs received from the cellular network to control their respective access to the cellular network. Such control of the access may for example relate to a random access procedure performed by the UE 10 for gaining initial access to the cellular network or to a paging procedure performed by the cellular network to reach a certain UE 10. Further, the information from the AITs may be utilized by the UE 10 for setting a beam-forming configuration, a link adaptation configuration, and/or a HARQ configuration applied when accessing the cellular network. The AIT entry including the information which is applicable for a specific access node 110, 110' is identified by the UE 10 on the basis of the identifiers transmitted by each access node 110, 110'. In the following, it will be assumed that the identifiers correspond to an SSS broadcasted by each access node 110, 110'.

The AITs do not need to be transmitted by each access node 110, 110'. In the illustrated example, the AITs are assumed to be transmitted only by the base stations 110 serving the macro cells, thereby ensuring that the AITs can be received throughout the coverage area of the cellular network. Further, each of the base stations 110 serving the macro cells and the base stations 110' serving the small cells broadcasts a corresponding SSS. Here, it is to be understood that the broadcasted SSSs may vary between the access nodes 110, 110'. However, it is also possible that certain access nodes 110, 110' broadcast the same SSS, e.g., when similar access parameters apply for these access nodes 110, 110'. By way of example, in the scenario of FIG. 1 the base stations 110 serving the macro cells could broadcast a first SSS, and the base stations 110' serving the small cells could broadcast a second SSS which is different from the first SSS.

In addition to the above mechanism of utilizing the SSS for selecting applicable information from the AITs, the AITs themselves may be adapted for individual UEs or groups of UEs. This is accomplished by the above-mentioned utilization of broadcast transmissions, unicast transmissions, and optionally also multicast transmissions for conveying the AITs to the UEs 10. Specifically, a first AIT may be provided in a broadcast transmission to all UEs 10 in the coverage area, wile a second AIT may be provided by in a unicast transmission a specific one of the UEs 10. Optionally, a third AIT may be provided in a multicast transmission to a group of some of the UEs 10. The UE 10 which received the first AIT and the second AIT, and optionally also the third AIT may then combine the information from the different AITs to a composite AIT which is then applied for controlling its access to the cellular network. Combining the information from the different AITs may involve supplementing AIT entries of the first AIT by AIT entries of the second AIT and/or of the third AIT. Further, AIT entries of the first AIT may be replaced or updated on the basis of AIT entries of the second AIT and/or third AIT.

The first AIT may indicate only basic information. Such basic information may include default parameters of a random access procedure and/or of a paging procedure. For example, such default parameters of a random access procedure could define that an opportunity for the UE 10 to transmit on a Random Access Channel (RACH) to a certain access node 110, 110' is at a certain time after transmission of the SSS by this access node 110, 110' or a certain time after transmission of the first AIT. Similarly, such default parameters of a random access procedure could define that an opportunity to receive data on a Paging Channel (PCH) from a certain access node 110, 110' is at a certain time after transmission of the SSS by this access node 110, 110' or a certain time after transmission of the first AIT. The number of AIT entries in the first AIT may be kept small by utilizing AIT entries which are mapped to a range of multiple SSSs. For example, in the scenario of FIG. 1 such range could include the SSS broadcasted by the base stations 110 serving the macro cells and the SSS broadcasted by the base stations 110' serving the small cells. In this way, the first AIT does not need to include a separate AIT entry for each different SSS.

The second AIT and/or third AIT, in the following also referred to as dedicated AIT, may include information which is more UE specific than the information in the first AIT. For example, such information may define more individualized opportunities to transmit on the RACH or receive data from the PCH. Further, such information may define parameters of a UE specific beam forming configuration, of a UE specific link adaptation configuration, or of a UE specific HARQ configuration. The second AIT or third AIT may include more AIT entries than the first AIT and thus define the information on the basis of which the UE 10 accesses the cellular network in a more detailed manner. The second AIT and/or third AIT may replace the default parameters from the first AIT provide additional AIT entries which were not yet included in the first AIT. Accordingly, the AIT entries of the first AIT may be mapped to a first group of SSSs, the AIT entries of the second AIT may be mapped to a second group of SSSs, the AIT entries of the third AIT may be mapped to a third group of SSSs, and the first group of SSSs, the second group of SSSs, and optionally also the third group of SSSs may overlap at least partially.

In an exemplary scenario, the first AIT may define a first AIT entry mapped to a first range of SSSs and indicating a first sparse set of opportunities for accessing the RACH in a random access procedure, and a second AIT entry mapped to a first range of SSSs and indicating a second sparse set of opportunities for accessing the RACH in a random access procedure.

The first range of SSSs may for example correspond to macro cells, while the second range of SSSs corresponds to small cells within the coverage areas of these macro cells. The first and second set of these RACH opportunities may differ from each other to avoid conflicts of a random access procedure in a small cell with a random access procedure in the macro cell covering this small cell. The second AIT may define extended access parameters. The dedicated AIT may define more AIT entries with a higher SSS granularity. For example, the dedicated AIT may define AIT entries on a per SSS basis. Each of such AIT entries may indicate a corresponding set of RACH opportunities which is denser than the above mentioned first and second set or RACH opportunities and differs from the sets of RACH opportunities indicated by the other AIT entries of the dedicated AIT. Different UEs 10 may be provided with different dedicated AITs, which allows for efficiently providing UE specific access parameters in the dedicated AIT, e.g., concerning a beam forming configuration to be applied by the UE 10.

Figure 2:
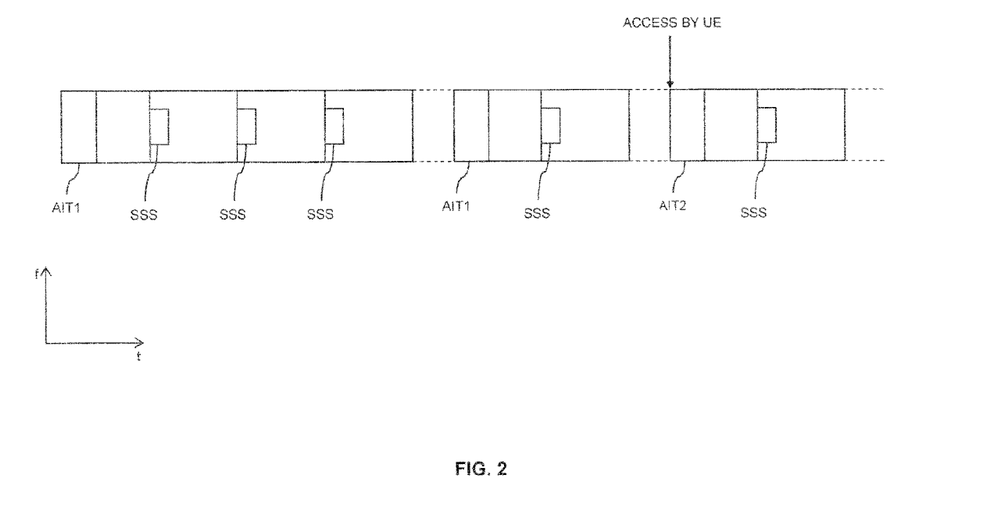
FIG. 2 schematically illustrates transmission of AITs and SSSs according to an embodiment of the invention.

FIG. 2 shows an example of high transmission of the first AIT (AIT1), the second AIT (AIT2), and the SSSs may be organized in the time (t) and frequency (f) domain. As illustrated, the SSSs are transmitted more frequently than the AITs. For example, a relatively long periodicity, e.g., from 1.024 s up to 10.24 s, may be utilized for transmission of the AITs, while a shorter periodicity, e.g., of about 100 ms, may be utilized for transmission of the SSSs. It should be noted that both periodicities may be longer than a granularity of resource allocation in the time domain, which may for example be based on time slots in the order of 1 ms.

Each SSS may for example define to a 10 bit data value, which allows for distinguishing between 1024 different SSSs. The received SSS is utilized by the UE 10 to identify an applicable entry of the received AIT. Initially, the received AIT will correspond to the first AIT. However, after reception of the second AIT by the UE 10, the received AIT will typically correspond to a combination of the first AIT and the second AIT. As illustrated in FIG. 1, initially the first AIT is broadcasted at the configured periodicity. However, in response to an access of a certain UE 10 to the cellular network, typically performed on the basis of information indicated by the first AIT, the second AIT is transmitted in a unicast transmission to this UE 10. After that, the UE 10 may access the cellular network on the basis of the information indicated by the second AIT, which may be more detailed and include UE specific parameters.

Transmission of the third AIT by a multicast transmission may be organized in a similar way. For example, access of one UE 10 from a certain group to the cellular network may trigger a multicast transmission of the third AIT to this group.

Updating of the AITs applied by a certain UE 10 may differ between the first AITs on the one hand and the dedicated AITs on the other hand. Upon receiving a new first AIT, the UE 10 may replace a previously received first AIT with the newly received first AIT. Upon receiving a new dedicated AIT, a previously received dedicated AIT may be replaced with the newly received dedicated AIT or the previously received dedicated AIT may be updated with the newly received dedicated AIT, e.g., by combining AIT entries from the previously received dedicated AIT and the newly received dedicated AIT.

For example, if the newly received dedicated AIT includes AIT entries mapped to one or more SSSs not covered by the previously received AIT, the previously received dedicated AIT may be supplemented by such AIT entries. Further, AIT entries of the previously received dedicated AIT which are mapped to a range of SSSs may be replaced by AIT entries of the newly received dedicated AIT which are mapped to single SSSs or smaller ranges of SSSs from the newly received dedicated AIT.

A dedicated AIT may also be discarded by the UE 10 or replaced or updated by the cellular network when detecting a corresponding need, e.g., when the UE 10 to which the dedicated AIT pertains has moved to another part of the coverage area, or if a newly transmitted first AIT does not comply with the dedicated AIT. After discarding the dedicated AIT, the UE 10 may utilize only the first AIT and/or request a new dedicated AIT from the cellular network.

In order to facilitate updating of AITs, an identifier assignment algorithm may be utilized which assigns identifiers to AITs based on their similarity. For example, such identifier assignment algorithm could assign identifiers which are close in Hamming distance to AITs to AITs which are close in Euclidian distance measured with respect to the information in the AITs, e.g., measured depending on the amount of overlap between the SSSs covered by one of the AITs and the SSSs covered by the other AIT. Two AITs may be regarded as similar if they contain the same AIT entries. The more AIT entries are the same, the more similar the AITs are. In such cases a dedicated AIT may be associated with an original first AIT, and if case a new first AIT is selected with an identifier which indicates that the original first AIT and the new first AIT are sufficiently similar, e.g., because the Hamming distance of the identifier of the new first AIT to the identifier of the original first AIT is less than a threshold, the currently utilized dedicated AIT may be considered as still valid. Otherwise the currently utilized dedicated AIT may need to be updated or discarded. In this way, unnecessary updating of the dedicated AIT may be avoided. If similar AITs are used in neighboring or close regions of the network less updating of the dedicated AIT may thus be needed when the UE 10 moves in the network.

Figure 3:
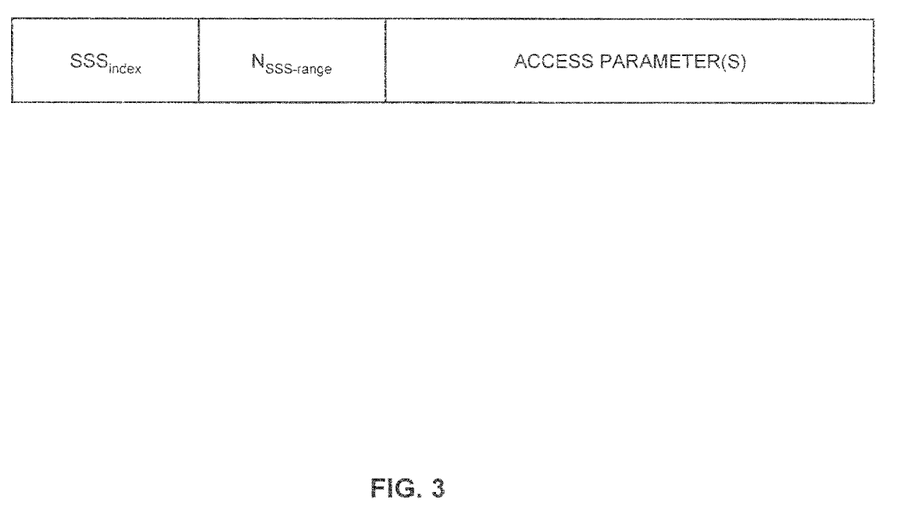
FIG. 3 shows an exemplary entry of an AIT according to an embodiment of the invention.

As mentioned above, the size of the AITs may be limited by mapping a range of SSSs to the same AIT entry. An example of a corresponding AIT entry is illustrated by FIG. 3. In the example of FIG. 3, a start of the range is defined by an SSS index, $SSS_{index}$, and the end of the range is defined by a number of SSSs covered by the range, $N_{sss-range}$. However, other ways of defining the range could be utilized as well, e.g., a first SSS index defining the start of the range and a second SSS index defining the end of the range.

In a heterogeneous network deployment using macro cells and small cells, such as illustrated by FIG. 1, it may for example be desirable to use the same SSS in an area which is not larger than a routing area. A UE 10 may thus determine from a received SSS whether the base station 110, 110' transmitting the SSS serves a cell from the same routing area as currently utilized by the UE 10 or from a different routing area than currently utilized by the UE 10. On the basis of the received SSS, the UE 10 may thus decide whether it needs to perform a location area update. Nonetheless, all base stations 110 serving macro cells may allow for utilizing the same access parameters. Accordingly, such access parameters may be efficiently indicated by a single AIT entry which is mapped to a range of SSSs transmitted by the base stations 110 serving the macro cells.

Irrespective of multiple SSSs being mapped to the same access parameters, the different SSSs may nonetheless be utilized for differentiating between different access nodes, e.g., when deriving reference signals, such as a root sequence, from the SSSs or for cell specific synchronization purposes.

Figure 4:
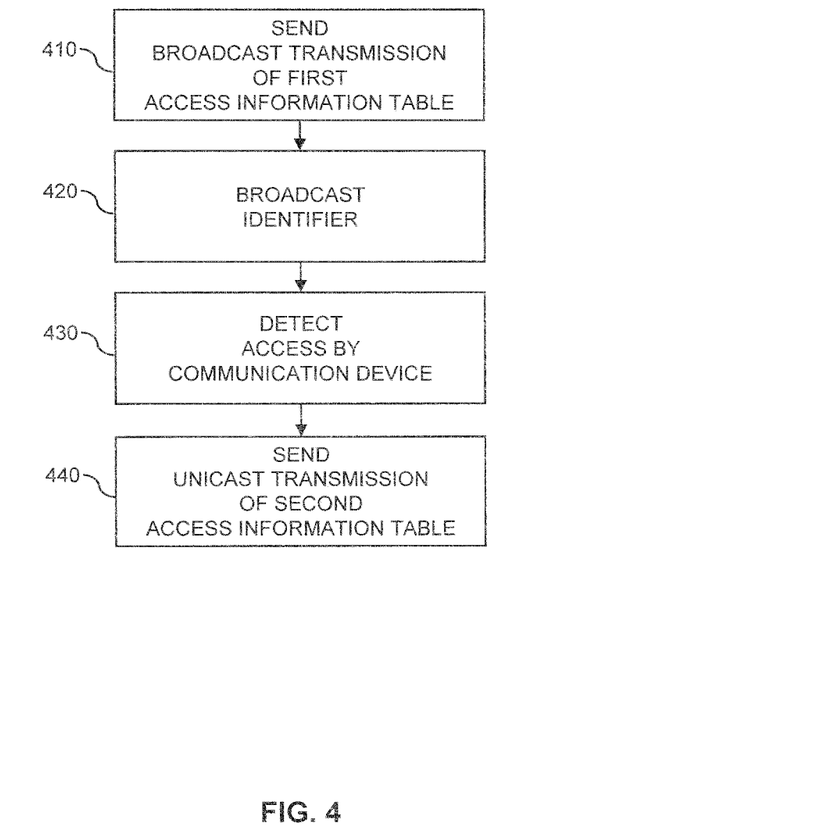
FIG. 4 shows a flowchart for schematically illustrating a method according to an embodiment of the invention.

FIG. 4 shows a flowchart for illustrating a method which may be utilized for implementing the illustrated concepts in an access node. The method may be performed by an access node of the cellular network, e.g., by a base station which is responsible for providing access of communication devices to the cellular network, such as one of the above-mentioned access nodes 110. If a processor-based implementation of the access node is used, the steps of the method may be performed by one or more processors of the access node. The communication devices may correspond to UEs, such as the UEs 10. However, the method may also be applied with respect to other kinds of communication devices, such as relay nodes or devices having only modem functionality.

At step 410, the access node sends a first AIT in a broadcast transmission to a plurality of communication devices. The first AIT includes a first group of entries, each entry of the first group indicating one or more parameters for controlling access of the communication devices to the cellular network. Each entry of the first group is mapped to an identifier from a first group of identifiers.

The parameters for controlling access to the cellular network indicated by the first AIT may relate to opportunities for performing a random access procedure and/or to opportunities for performing a paging procedure.

At step 420, the access node may broadcast an identifier from the first group of identifiers. On the basis of the broadcasted identifier, a communication device may identify an entry of the first AIT which is applicable for the access node.

At step 430, the access node may detect access of one of the communication devices to the cellular network. This access may be based on one or more of the parameters indicated by the first AIT.

At step 440, the access node sends a second AIT in a unicast transmission to one of the communication devices. For example, in response to detecting that the communication device accessed the cellular network at step 430, the access node may send the second AIT to this communication device.

The second AIT includes a second group of entries. Each entry of the second group indicates one or more parameters for controlling access of the communication device to the cellular network. Each entry of the second group is mapped to an identifier from a second group of identifiers. The first group of identifiers and the second group of identifiers may overlap at least partially.

The parameters for controlling access to the cellular network indicated by the second AIT may relate to opportunities for performing a random access procedure and/or to opportunities for performing a paging procedure. Further, the parameters for controlling access to the cellular network indicated by the second AIT may relate to a UE specific beam-forming configuration, a UE specific link adaptation configuration, and/or a UE specific HARQ configuration.

In some scenarios, the access node may also send a third AIT in a multicast transmission to a group consisting of some of the communication devices. The third AIT includes a third group of entries. Each entry of the third group indicates one or more parameters for controlling access of the some communication devices to the cellular network. Each entry of the third group is mapped to an identifier from a third group of identifiers. In such cases, the first group of identifiers, the second group of identifiers, and the third group of identifiers may overlap at least partially.

The parameters for controlling access to the cellular network indicated by the third AIT may relate to opportunities for performing a random access procedure and/or to opportunities for performing a paging procedure. Further, the parameters for controlling access to the cellular network indicated by the third AIT may relate to a UE group specific beam-forming configuration, a UE group specific link adaptation configuration, and/or a UE group specific HARQ configuration.

The identifiers of the first group and of the second group, and optionally the identifiers of the third group may correspond to SSSs transmitted by access nodes of the cellular network.

In some scenarios, one of the entries of the first group may mapped to a plurality of the identifiers of the first group, e.g., by utilizing a mapping to an SSS range as explained in connection with FIG. 3. Similarly, also one of the entries of the second group could be mapped to a plurality of the identifiers of the second group and/or one of the entries of the third group could be mapped to a plurality of the identifiers of the third group.

The first AIT, the second AIT, and optionally the third AIT may be determined by the access node, e.g., based on information or rules configured in the access node and/or on information provided from a core network part of the cellular network.

Accordingly, an access node for a cellular network which operates according to the method of FIG. 4 may be provided with a module configured to send a first AIT in a broadcast transmission as explained in connection with step 410 and a module configured to send a second AIT in a unicast transmission as explained in connection with step 440. Further, the access node may also be provided with a module configured to send a third AIT in a multicast transmission as also explained in connection with step 440. Further, the access node may be provided with a module configured to send broadcast an identifier as explained in connection with step 420 and/or to detect access of a communication device as explained in connection with step 430.

Figure 5:
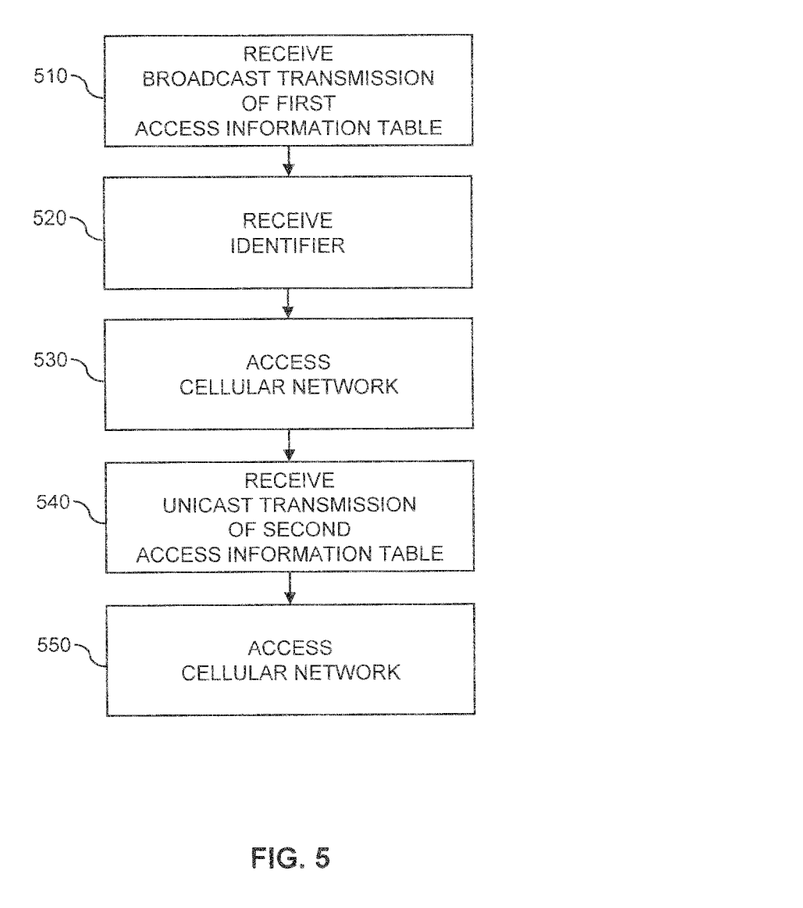
FIG. 5 shows a flowchart for schematically illustrating a further method according to an embodiment of the invention.

FIG. 5 shows a flowchart for illustrating a method which may be utilized for implementing the illustrated concepts in a communication device. The communication device may correspond to a UE, such as one of the UEs 10. However, the communication device could also correspond to other kinds of communication devices, such as relay nodes or devices having only modem functionality. If a processor-based implementation of the communication device is used, the steps of the method may be performed by one or more processors of the communication device.

At step 510, the communication device receives a first AIT in a broadcast transmission addressed to a plurality of communication devices. The first AIT includes a first group of entries, each entry of the first group indicating one or more parameters for controlling access of the communication devices to the cellular network. Each entry of the first group is mapped to an identifier from a first group of identifiers.

The parameters for controlling access to the cellular network indicated by the first AIT may relate to opportunities for performing a random access procedure and/or to opportunities for performing a paging procedure.

At step 520, the communication device may receive an identifier from the first group of identifiers, e.g., as broadcasted by an access node of the cellular network, such as by one of the access nodes 110, 110'. On the basis of the identifier, the communication device may identify an entry of the first AIT which is applicable for this access node.

At step 530, the communication device may access the cellular network. This access may be based on one or more of the parameters indicated by the first AIT.

At step 540, the communication device receives a second AIT in a unicast transmission addressed to the communication device. For example, in response to performing the access to the cellular network at step 530, the communication device may receive the second AIT from the cellular network.

The second AIT includes a second group of entries. Each entry of the second group indicates one or more parameters for controlling access of the communication device to the cellular network. Each entry of the second group is mapped to an identifier from a second group of identifiers. The first group of identifiers and the second group of identifiers may overlap at least partially.

The parameters for controlling access to the cellular network indicated by the second AIT may relate to opportunities for performing a random access procedure and/or to opportunities for performing a paging procedure. Further, the parameters for controlling access to the cellular network indicated by the second AIT may relate to a UE specific beam-forming configuration, a UE specific link adaptation configuration, and/or a UE specific HARQ configuration.

In some scenarios, the communication device may also receive a third AIT in a multicast transmission addressed to a group consisting of some of the communication devices. The third AIT includes a third group of entries. Each entry of the third group indicates one or more parameters for controlling access of the some communication devices to the cellular network. Each entry of the third group is mapped to an identifier from a third group of identifiers. In such cases, the first group of identifiers, the second group of identifiers, and the third group of identifiers may overlap at least partially.

The parameters for controlling access to the cellular network indicated by the third AIT may relate to opportunities for performing a random access procedure and/or to opportunities for performing a paging procedure. Further, the parameters for controlling access to the cellular network indicated by the third AIT may relate to a UE group specific beam-forming configuration, a UE group specific link adaptation configuration, and/or a UE group specific HARQ configuration.

The identifiers of the first group and of the second group, and optionally the identifiers of the third group may correspond to SSSs transmitted by access nodes of the cellular network.

In some scenarios, one of the entries of the first group may mapped to a plurality of the identifiers of the first group, e.g., by utilizing a mapping to an SSS range as explained in connection with FIG. 3. Similarly, also one of the entries of the second group could be mapped to a plurality of the identifiers of the second group and/or one of the entries of the third group could be mapped to a plurality of the identifiers of the third group.

On the basis of one or more of the parameters indicated by the first AIT, the second AIT, and optionally the third AIT, the communication device then accesses the cellular network, as indicated by step 550. This may involve performing a random access procedure or a paging procedure. Further, this may involve utilizing a beam forming configuration, link adaptation configuration, and/or HARQ configuration as defined by the parameter(s) indicated by the first AIT, the second AIT, and optionally the third AIT.

Accordingly, a communication device which operates according to the method of FIG. 5 may be provided with a module configured to receive a first AIT in a broadcast transmission as explained in connection with step 510, a module configured to receive a second AIT in a unicast transmission as explained in connection with step 540, and a module configured to control access of the communication device to the cellular network as explained in connection with step 550. Further, the communication device may also be provided with a module configured to receive a third AIT in a multicast transmission as also explained in connection with step 540. Further, the communication device may be provided with a module configured to receive broadcast an identifier as explained in connection with step 520 and/or to control access of to the cellular network as explained in connection with step 530.

It is to be understood that the methods of FIGS. 4 and 5 may also be combined in a system which includes one or more access nodes operating according to the method of FIG. 4 and one or more communication devices operating according to the method of FIG. 5. Further, such system may also include additional access nodes which broadcast and identifier as explained in connection with step 420 of FIG. 4, but do not transmit AITs.

Figure 6:
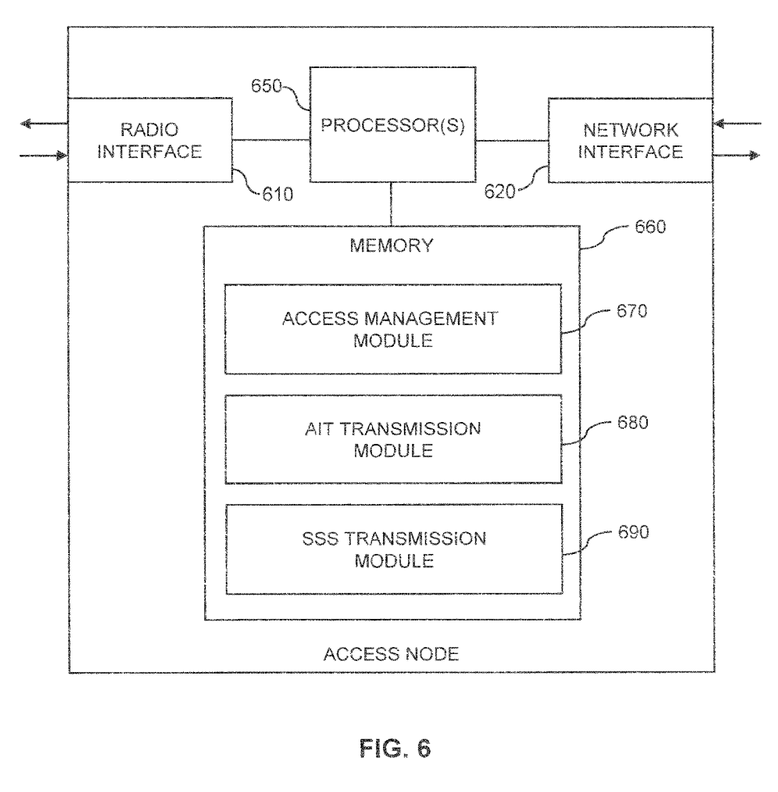
FIG. 6 schematically illustrates an access node according to an embodiment of the invention.

FIG. 6 illustrates exemplary structures which may be used for implementing the above concepts in an access node of a cellular network, such as one of the access nodes 110. The access node may for example correspond to a base station of the cellular network.

As illustrated, the access node may include a radio interface 610 for providing one or more communication devices access to the cellular network. Further, the access node may include a network interface 620 for connecting to a core network part of the cellular network and/or to other access nodes.

Further, the access node may include one or more processors 650 coupled to the interfaces 610, 620, and a memory 660 coupled to the processor(s) 650. The memory 660 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 660 includes suitably configured program code to be executed by the processor(s) 650 so as to implement the above-described functionalities of the access node. In particular, the memory 660 may include various program code modules for causing the access node to perform processes as described above, e.g., corresponding to the method steps of FIG. 4.

As illustrated, the memory 660 may include an access management module 670 for implementing the above-described functionalities of determining AITs. Further, the memory 660 may include an AIT transmission module 680 for implementing the above-described functionalities of transmitting AITs in a broadcast transmission, unicast transmission, or multicast transmission, e.g., as explained in connection with steps 410 and 440 of FIG. 4.

Further, the memory 660 may also include an SSS transmission module for implementing the above-described functionalities of transmitting an identifier, e.g., as explained in connection with step 420 of FIG. 4.

It is to be understood that the structures as illustrated in FIG. 6 are merely schematic and that the access node may actually include further components which, for the sake of clarity, have not been illustrated, e.g., further interfaces or processors. Also, it is to be understood that the memory 660 may include further types of program code modules, which have not been illustrated, e.g., program code modules for implementing known functionalities of an access node. According to some embodiments, also a computer program may be provided for implementing functionalities of the access node, e.g., in the form of a physical medium storing the program code and/or other data to be stored in the memory 660 or by making the program code available for download or by streaming.

Figure 7:
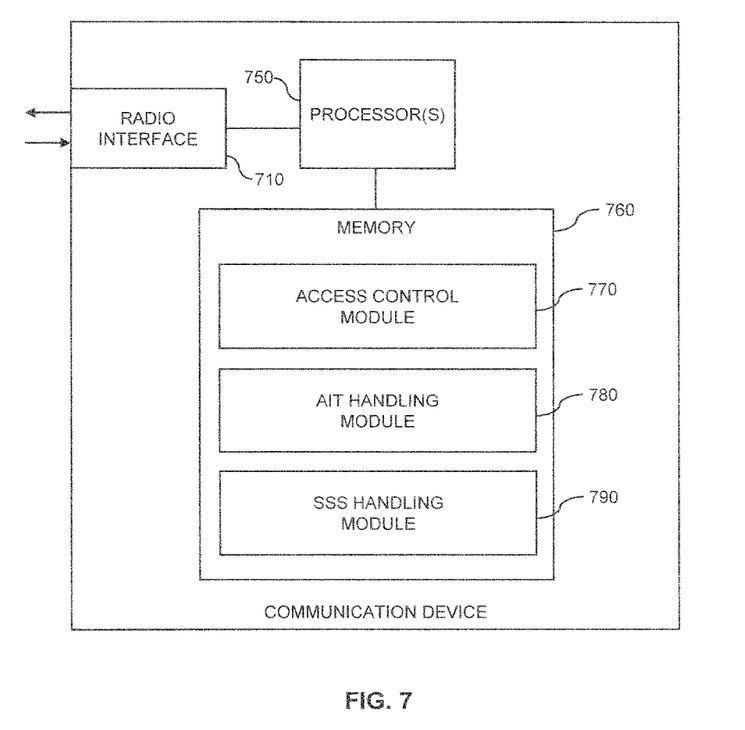
FIG. 7 schematically illustrates a communication device according to an embodiment of the invention.

FIG. 7 illustrates exemplary structures which may be used for implementing the above concepts in a communication device for accessing a cellular network. The communication device may for example correspond to a UE, such as one of the UEs 10. However, the communication device could also correspond to a relay node or to a cellular network modem.

As illustrated, the communication device may include a radio interface 710 for accessing the cellular network.

Further, the communication device may include one or more processors 750 coupled to the radio interface 710, and a memory 760 coupled to the processor(s) 750. The memory 760 may include a ROM, e.g., a flash ROM, a RAM, e.g., a DRAM or SRAM, a mass storage, e.g., a hard disk or solid state disk, or the like. The memory 760 includes suitably configured program code to be executed by the processor(s) 750 so as to implement the above-described functionalities of the communication device. In particular, the memory 760 may include various program code modules for causing the communication device to perform processes as described above, e.g., corresponding to the method steps of FIG. 5.

As illustrated, the memory 760 may include an access control module 770 for implementing the above-described functionalities of controlling access to the cellular network on the basis of information indicated by AITs, e.g., as explained in connection with step 550 of FIG. 5. Further, the memory 760 may include an AIT handling module 780 for implementing the above-described functionalities of receiving AITs in a broadcast transmission, unicast transmission, or multicast transmission, e.g., as explained in connection with steps 510 and 540 of FIG. 5. Functionalities of the AIT handling module 780 may also involve combining different received AITs. Further, the memory 760 may also include an SSS handling module 790 for implementing the above-described functionalities of receiving an identifier to be utilized for identifying applicable AIT entries, e.g., as explained in connection with step 520 of FIG. 5.

It is to be understood that the structures as illustrated in FIG. 7 are merely schematic and that the communication device may actually include further components which, for the sake of clarity, have not been illustrated, e.g., further interfaces or processors. Also, it is to be understood that the memory 760 may include further types of program code modules, which have not been illustrated, e.g., program code modules for implementing known functionalities of a UE. According to some embodiments, also a computer program may be provided for implementing functionalities of the communication device, e.g., in the form of a physical medium storing the program code and/or other data to be stored in the memory 760 or by making the program code available for download or by streaming.

As can be seen, the concepts as described above may be used for efficiently distributing information for controlling access of communication devices to a cellular network. Excessive sizes of broadcasted AITs can be avoided by further utilizing unicast transmissions or multicast transmissions for transmitting dedicated AITs to specific UEs or groups of UEs.

It is to be understood that the examples and embodiments as explained above are merely illustrative and susceptible to various modifications. For example, the illustrated concepts may be applied in connection with various radio technologies, without limitation to the above-mentioned example of a 5G radio technology. Further, the illustrated concepts may be applied in connection with various kinds of access nodes and communication devices. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method of controlling access to a cellular network, the method comprising:
    an access node of the cellular network sending a first access information table in a broadcast transmission to a plurality of communication devices, the first access information table comprising a first group of entries, each entry of the first group indicating one or more parameters for controlling access of the plurality of communication devices to the cellular network and being mapped to an identifier from a first group of identifiers; and
    the access node sending a second access information table in a unicast transmission to a communication device of the plurality of communication devices, the second access information table comprising a second group of entries, each entry of the second group indicating one or more parameters for controlling access of the communication device to the cellular network and being mapped to an identifier from a second group of identifiers,
    wherein the one or more parameters for controlling access to the cellular network indicated by the first access information table and the second access information table relate to opportunities for performing a random access procedure.

2. The method of claim 1, wherein the first group of identifiers and the second group of identifiers are at least partially overlapping.

3. The method of claim 1, further comprising:
    the access node sending a third access information table in a multicast transmission to a group consisting of some of the plurality of communication devices, the third access information table comprising a third group of entries, each entry of the third group indicating one or more parameters for controlling access of the some of the plurality of communication devices to the cellular network and being mapped to an identifier from a third group of identifiers.

4. The method of claim 3, wherein the first group of identifiers, the second group of identifiers, and the third group of identifiers are at least partially overlapping.

5. The method of claim 1, wherein the one or more parameters for controlling access to the cellular network indicated by the first access information table and the second access information table further relate to opportunities for performing a paging procedure.

6. The method of claim 1, wherein the one or more parameters for controlling access to the cellular network indicated by the second access information table further relate to one or more of: a beam-forming configuration, a link adaptation configuration, and/or a Hybrid Automatic Repeat Request configuration.

7. The method of claim 1, wherein the first group of identifiers and the second group of identifiers correspond to signature sequences transmitted by access nodes of the cellular network.

8. The method of claim 1, wherein the access node performs the sending of the second access information table to the communication device in response to the communication device accessing the cellular network based on the one or more parameters indicated by the first access information table.

9. A method of controlling access to a cellular network, the method comprising a communication device:
    receiving, from the cellular network, a first access information table in a broadcast transmission addressed to a plurality of communication devices, the first access information table comprising a first group of entries, each entry of the first group indicating one or more parameters for controlling access of the plurality of communication devices to the cellular network and being mapped to an identifier from a first group of identifiers;
    receiving a second access information table in a unicast transmission, from the cellular network, addressed to a communication device of the plurality of communication devices, the second access information table comprising a second group of entries, each entry of the second group indicating one or more parameters for controlling access of the communication device to the cellular network and being mapped to an identifier from a second group of identifiers, wherein the one or more parameters for controlling access to the cellular network indicated by the first access information table and the second access information table relate to opportunities for performing a paging procedure; and accessing the cellular network based on the one or more parameters indicated by the first access information table and the second access information table.

10. The method of claim 9, wherein the first group of identifiers and the second group of identifiers are at least partially overlapping.

11. The method of claim 9, further comprising:

the communication device receiving, from the cellular network, a third access information table in a multicast transmission addressed to a group consisting of some of the plurality of communication devices, the third access information table comprising a third group of entries, each entry of the third group indicating one or more parameters for controlling access of the some of the plurality of communication devices to the cellular network and being mapped to an identifier from a third group of identifiers.

12. The method of claim 11, wherein the first group of identifiers, the second group of identifiers, and the third group of identifiers are at least partially overlapping.

13. The method of claim 9, wherein the one or more parameters for controlling access to the cellular network indicated by the first access information table and the second access information table further relate to opportunities for performing a random access procedure.

14. The method of claim 9, wherein the one or more parameters for controlling access to the cellular network indicated by the second access information table further relate to one or more of: a beam-forming configuration, a link adaptation configuration, and/or a Hybrid Automatic Repeat Request configuration.

15. The method of claim 9, wherein the first group of identifiers and the second group of identifiers correspond to signature sequences transmitted by access nodes of the cellular network.

16. The method of claim 9, further comprising the communication device:

accessing the cellular network based on the one or more parameters indicated by the first access information table; and in response to the accessing the cellular network, receiving the second access information table from the cellular network.

17. An access node for a cellular network, the access node comprising:

a radio interface; and a processing circuit configured to:

send, via the radio interface, a first access information table in a broadcast transmission to a plurality of communication devices, the first access information table comprising a first group of entries, each entry of the first group indicating one or more parameters for controlling access of the plurality of communication devices to the cellular network and being mapped to an identifier from a first group of identifiers; and send, via the radio interface, a second access information table in a unicast transmission to a communication device of the plurality of communication devices, the second access information table comprising a second group of entries, each entry of the second group indicating one or more parameters for controlling access of the communication device to the cellular network and being mapped to an identifier from a second group of identifiers, wherein the one or more parameters for controlling access to the cellular network indicated by the first access information table and the second access information table relate to opportunities for performing a random access procedure.

18. A communication device, comprising:

a radio interface for accessing a cellular network; and a processing circuit configured to:

receive, from the cellular network, a first access information table in a broadcast transmission addressed to a plurality of communication devices, the first access information table comprising a first group of entries, each entry of the first group indicating one or more parameters for controlling access of the plurality of communication devices to the cellular network and being mapped to an identifier from a first group of identifiers;

receive a second access information table in a unicast transmission from the cellular network, addressed to a communication device of the plurality of communication devices, the second access information table comprising a second group of entries, each entry of the second group indicating one or more parameters for controlling access of the communication device to the cellular network and being mapped to an identifier from a second group of identifiers, wherein the one or more parameters for controlling access to the cellular network indicated by the first access information table and the second access information table relate to opportunities for performing a paging procedure; and access the cellular network based on the one or more parameters indicated by the first access information table and the second access information table.

* * * * *